Sept. 8, 1942.           C. R. HANNA           2,295,399
SHEET THICKNESS REGULATOR FOR CONTINUOUS MILLS
Filed Oct. 30, 1940

WITNESSES:

INVENTOR
Clinton R. Hanna.
BY
Paul E. Friedeman
ATTORNEY

Patented Sept. 8, 1942

2,295,399

UNITED STATES PATENT OFFICE 2,295,399

SHEET THICKNESS REGULATOR FOR CONTINUOUS MILLS

Clinton R. Hanna, Pittsburgh, Pa., assignor to Westinghouse Electric & Manufacturing Company, East Pittsburgh, Pa., a corporation of Pennsylvania Application October 30, 1940, Serial No. 363,457

11 Claims. (Cl. 80—35)

My invention relates to a control system for automatically maintaining a moving sheet at a predetermined thickness. While my invention is of general application, it is particularly suitable for steel mills wherein a predetermined thickness of a rolled sheet is desired.

An object of my invention is to provide a control system for controlling the tension of a moving sheet of material such as steel so as to maintain constant thickness automatically and in addition, to provide a tension regulating means which will prevent either abnormally high or abnormally low tension on said sheet.

Another object of my invention is to provide anti-hunting means in the above described control system so as to have very close regulation with a minimum amount of hunting.

Still another object of my invention is to provide a control system having a pneumatically responsive thickness indicator for detecting the thickness of a travelling sheet of material, which control system is simple, inexpensive, and yet highly reliable in operation.

Other objects and advantages will become more apparent from a study of the following specification when considered in conjunction with the accompanying drawing, in which.

In modern mills, such as steel mills, the tension before and after a pass through a stand is regulated either by motor current regulation or by idler tensiometer control. The value of the tension may be altered during the pass by the operator for purposes of varying the gauge of the sheet. Different speeds require different values of tension for the same gauge for example.

In accordance with my invention, the deviations of a gauge are made to control the tension of a sheet of steel or other material in such a manner as to maintain constant gauge automatically. In addition, a minimum tension regulator and a maximum tension regulator are included to prevent the tension from falling so low that wrinkling occurs or rising so high that the sheet breaks. These merely rob the thickness regulator of its control when it calls for too little or too much tension. By an indication of motor current, the operator will understand that the rolls must be screwed up or down to bring the system back into the range for which thickness control by the thickness of the sheet is possible.

A "silverstat" actuated mechanically or pneumatically, by variations in sheet thickness, acts as a means for varying motor torque to control tension. Any other thickness sensing means such as the strain gauge (magnetic) can be substituted.

Figure 1:
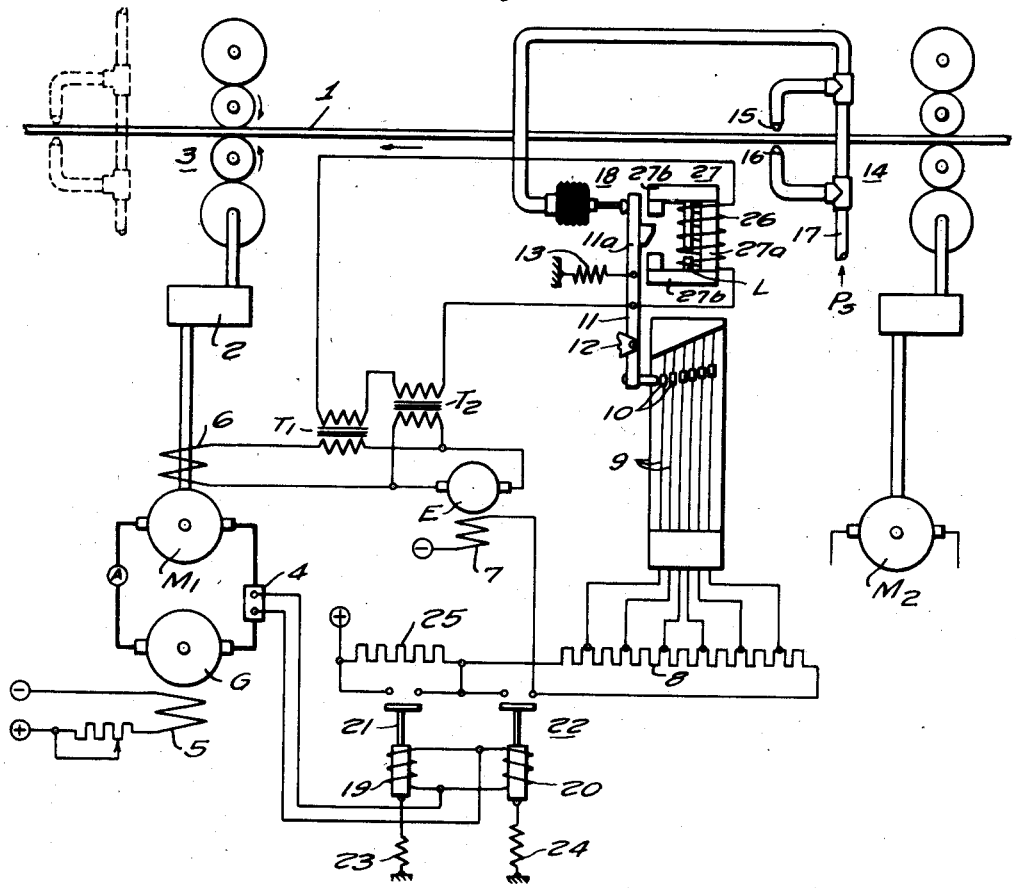
Figure 1 is a control system embodying the principles of my invention.

Referring more particularly to Fig. 1 of the drawing, numeral 1 denotes a sheet of material, such as steel or any other material, whose thickness is to be maintained at a constant value and to which a definite maximum and a definite minimum tension may be applied. Sheet 1 is driven and tensioned by means of a motor $M_1$ which drives through a gear box 2 through a system of rollers 3 so as to move the sheet and tension the same in the direction indicated by the arrow. A motor $M_2$ drives similar rolls, which motor is substantially synchronously driven with respect to motor $M_1$. Connected in loop circuit with the armature of the motor $M_1$ is an ammeter A and the armature of generator G and a shunt 4. The generator G is excited by the field winding 5 which is energized by a constant source of potential indicated by $+$ and $-$. The motor shunt field winding 6 is connected across the armature of an exciter E, which exciter has a field winding 7 connected in series with a variable resistor 8. The variation in the value of resistance of 8 is obtained by virtue of a plurality of flexible leaves 9 which support a plurality of contact members 10, which contact members are progressively closed so as to progressively shunt greater and greater portions of the resistance of 8. As armature 11 is pivoted at 12 and is biased by a spring 13 so as to normally tend to maintain the contact members in the closed position, a supply of air at a constant pressure $P_s$ is provided through a system of pipes 14 and is fed through opposed nozzle openings 15 and 16. An orifice 17 is provided, which orifice is effective to constrict the air flow going through both of the nozzle openings 15 and 16. A bellows actuated plunger 18 is also connected to the system of pipes 14. Elements 14 to 18, inclusive, constitute a thickness detector means. As the sheet 1 increases in thickness, the nozzle openings at 15 and 16 become more constricted, hence building up a pressure in the bellows, thereby effecting clockwise movement of the armature 11 about its pivot 12. On the other hand, when the thickness of sheet 1 decreases, the nozzle openings 15 and 16 are less obstructed by the sheet, thereby allowing the pressure in the bellows to decrease, thus allowing the spring 13 to move armature 11 in a counterclockwise direction.

The specific details of my pneumatically responsive thickness detector are set forth in a copending application of C. R. Hanna and S. J. Mikina, application No. 366,876, filed November 23, 1940, and entitled "Pneumatic thickness gauge."

The operation of the device is as follows: Assume that the system is in a deenergized condition such as is shown in Fig. 1. The exciter armature and generator armature are driven by a main driving motor (not shown) as is well known in variable voltage systems. As the speeds of a generator and exciter G and E are brought up to a normal value, the excitation of motor M1 is increased in the field winding 6. Hence the motor M1 will generate more and more torque in driving the rollers 3. As the torque increases, the current in the loop circuit between the motor and generator armatures (hence the current through the shunt 4) increases, thereby gradually increasing the energization of coils 19 and 20 of relays 21 and 22, respectively. Relay 21 is biased by a spring 23 so that its contact members are normally in the open position. Relay 22 is also normally biased so that its contacts are in the open position by virtue of a spring 24 which is a stronger spring than spring 23. As the armature current builds up to a certain value, coil 19 becomes energized sufficiently so as to close its contact members, thereby shunting a resistor 25. Thus, it will be seen that the exciter field winding 7 has only the variable resistor 8 in series therewith. Hence resistor 8 will, by virtue of the control movement of armature 11, regulate the excitation of field winding 7 and in turn regulate the excitation of the motor shunt field winding 6. As the sheet becomes thicker, the pressure increases in the bellows, therefore, causing the bellows actuated plunger 18 to move the armature 11 in a clockwise direction, thereby progressively opening the contact members 10, thus progressively inserting more and more resistance of the variable resistor 8 in series with the exciter field winding 7, thereby weakening the latter. This will have the effect of decreasing the exciter armature voltage and decreasing the excitation of the motor shunt field winding 6 which will cause an increase in speed of motor M1. The motor will thus drive sheet 1 faster and will tend to increase the tension of the sheet, therefore will tend to decrease the thickness thereof. On the other hand, if the sheet is thinner than a predetermined optimum value, the pressure in the pipe system 14 will decrease, causing armature 11 to move in under the influence of tension spring 13 in a counter-clockwise direction, shunting insertion of more and more resistance 8, thereby progressively strengthening the exciter field winding 7 and the motor shunt field winding 6 which, in turn, will slow down the motor M1, thereby lessening the tension or pull on sheet 1 which in turn has the effect of allowing the sheet to build up in thickness. In this way, it will be seen that the tension of sheet 1 is maintained at a substantially constant value. Hence, the thickness of sheet 1 is also automatically maintained at a relatively constant value.

In order to prevent the tension of sheet 1 from falling so low that wrinkling occurs or rising so high that the sheet breaks, relays 21 and 22 are provided for the function of robbing the thickness regulator of its control when it calls for too little or too much tension, respectively. Assume that the thickness of sheet 1 is abnormally high because of a relatively small tension therein. The armature current flowing through the shunt 4 will become so low as to be insufficient to maintain the contacts of relay 21 in their normally closed position. As a result, spring 23 will open the contact members therefore, inserting resistor 25 in series circuit with the variable resistor 8 and the exciter field winding 7, thus causing a weakening of the field. This, in turn, will effect weakening of the motor field winding excitation, thereby causing an increase in speed of the motor which will take up the slack in the sheet 1 and increase the tension thereof to a safe value, at which wrinkling will not occur.

Let us assume now that the tension eventually increases to such an extent that the sheet 1 becomes too thin. This will result in an abnormal increase in the armature current, therefore, an increase in energization of coil 20, which energization will finally become sufficient to overcome the tension of spring 24, therefore effecting closing of the contact members thereof, which results in the shunting of the variable resistor 8. At this moment, the exciter field winding 7 is connected directly across the full voltage of the external source of potential indicated by symbols + and —. Hence, the field winding 7 will become appreciably strengthened, resulting in appreciable strengthening of motor field winding 6. As a result of this, the speed of motor M1 will decrease, thereby allowing more slack in the sheet 1 or in other words, allowing the tension to decrease to a safe value, at which there would be no danger of breakage. It will thus be seen that I have provided not only a means for maintaining relatively constant thickness of a sheet of metal but have provided regulator means for guarding against over-tensioning or under-tensioning of the sheet so as to avoid the possibility of breakage or wrinkling, respectively. By an indication of motor current in the ammeter A, the operator will understand that the rolls must be screwed up or down to bring the system back into the range for which thickness control by the pneumatically responsive thickness in the detector is possible.

While the pneumatically responsive detector is shown, it will be apparent that insofar as the rest of the control system is concerned, any other thickness sensing means, such as a magnetic strain gauge, can be substituted therefor. It will also be apparent that instead of relays 21 and 22 in which a single resistance step is shunted, a variable resistor such as of the type shown at 8, 9, 10, (namely, a "silverstat"), may be substituted so as to give a gradual instead of an abrupt change of resistance.

In order to provide an anti-hunting force, transformers such as T1 and T2 are provided. Coil 26 of an electromagnet 27 is connected in series with the secondary of the transformers, the primaries of which are connected, respectively, in series and in parallel with the exciter armature. It will thus be apparent that when the sheet is too thick, causing clockwise movement of armature 11, by virtue of the force of the bellows actuated plunger 18 resulting in weakening of the exciter field strength and voltage, a coil 26 will be energized less and less, therefore allowing the tension spring 13 to oppose the action of the plunger 18, that is, to tend to move the armature in a counter-clockwise direction. On the other hand, if the sheet is too thin, it has the effect of allowing armature 11 to move counter-clockwise by virtue of tension spring 13, therefore effecting strengthening of exciter field winding 7. The excited voltage will build up to an extent so as to increase the energization of coil 26, therefore effecting a greater attraction force with a link 11a of the armature 11. The electromagnet 27 has a core formed of two soft iron legs 27b and a permanent magnet 27a, the latter being for the purpose of polarization.

The coil 26 is used solely for anti-hunting. If desired, however, and as a substitute for the permanent magnet, an additional direct current source under control of an operator (not shown) may be applied to the coil for changing the regulation point instead of adjusting the spring 13. The coil 26 polarizes the magnetic circuit so that if no direct current source is employed, the anti-hunting voltages from transformers $T_1$ and $T_2$ will produce + and − forces for + and − polarities. The coil 26 surrounds, not only the permanent magnet 27a, but the leakage path L which includes an air gap. Although this path increases the required flux from the magnet, it is desirable because of the low reluctance path it provides for flux changes produced by the coil. The force of the tension spring 13 is sufficient to balance the average magnetic pull on the armature in addition to the regulated air pressure of the bellows. It will, therefore, be seen that coil 26 is energized by circulating current produced by movement of the armature produced forces 180° out of phase with the velocity giving rise to mechanical damping.

Figure 2:
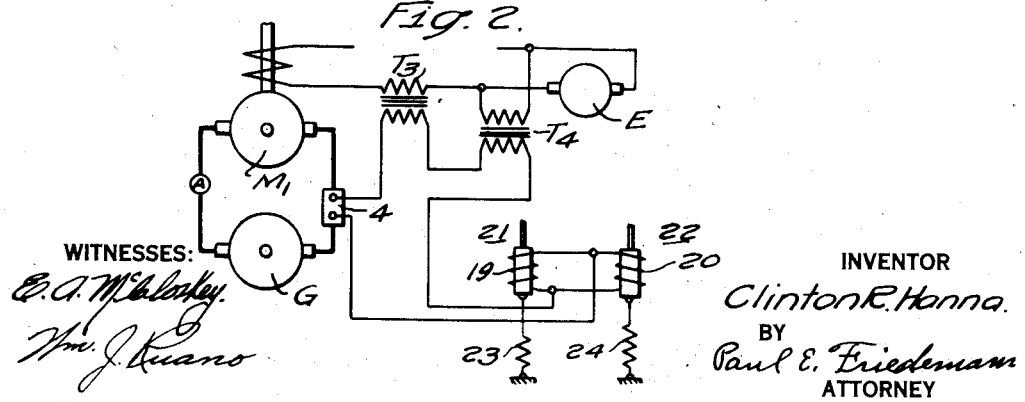
Fig. 2 is a schematic showing of a modification of the control system shown in Fig. 1.

If it is desired to make the system still more free from hunting, additional transformers such as $T_3$ and $T_4$, as shown in Fig. 2, are provided having their primaries similarly connected but having their secondaries connected in series with the shunt 4 and the coils 19 and 20 of the relays 21 and 22, respectively.

By virtue of this system, the voltages from the secondaries of transformers $T_3$ and $T_4$ are applied serially with respect to the voltage across the shunt 4 having the result of applying anti-hunting force in opposition to the voltages built up across coils 19 and 20 by virtue of the armature current changes.

I am, of course, aware that others, particularly after having had the benefit of the teachings of my invention, may devise other devices embodying my invention, and I, therefore, do not wish to be limited to the specific showings made in the drawing and the description disclosure hereinbefore made, but wish to be limited only by the scope of the appended claims and such prior art that may be pertinent.

I claim as my invention:

1. A control system for regulating the thickness of a travelling sheet of material, comprising, in combination, a motor for driving and applying tension to the sheet, pressure responsive means including a source of air supply and a nozzle supplied thereby and located closely adjacent the surface of the sheet which is responsive to the thickness of the sheet for regulating the motor torque, hence the sheet tension and thickness, within a predetermined range, and means responsive to the occurrence of abnormal tension, either above or below said predetermined range, for altering the effectiveness of said thickness responsive means.

2. A control system for regulating the thickness of a travelling sheet of material, comprising, in combination, a motor for driving and applying tension to the sheet, pressure responsive means including a source of air supply and a nozzle supplied thereby and located closely adjacent the surface of the sheet which is responsive to the thickness of the sheet for regulating the motor torque, hence the sheet tension and thickness, within a predetermined range, and means responsive to abnormally high or abnormally low current flow through the motor resulting from occurrence of abnormal tension, outside of said predetermined range, for altering the effectiveness of said thickness responsive means so as to restore said abnormal tension to a normal value.

3. A variable voltage control system for regulating the thickness of a travelling sheet of material, comprising, in combination, a generator and motor having armatures connected in loop circuit, and having separated field windings, said motor being effective to drive and tension said sheet, variable resistance means for controlling the field strength of said motor field winding, means responsive to the thickness of the sheet for varying said variable resistance means within a predetermined range so as to control, in small increments, the torque of said motor, hence the tension and thickness of said sheet, means responsive to abnormally high and abnormally low current through said armature loop circuit of the motor and generator for modifying the effectiveness of said variable means in its control function so as to limit the motor torque and sheet tension to a predetermined optimum range of value.

4. A variable voltage control system for regulating the thickness of a travelling sheet of material, comprising, in combination, a generator and motor having armatures connected in loop circuit, and having separated field windings, said motor being effective to drive and tension said sheet, variable resistance means for controlling the field strength of said motor field winding, pressure responsive means including a source of air supply and a nozzle supplied thereby and located closely adjacent the surface of the sheet which is responsive to the thickness of the sheet for varying said variable resistance means within a predetermined range so as to control, in small increments, the torque of said motor, hence the tension and thickness of said sheet, means responsive to abnormally high and abnormally low current through said armature loop circuit of the motor and generator for modifying the effectiveness of said variable means in its control function so as to limit the motor torque and sheet tension to a predetermined optimum range of value.

5. A variable voltage control system for regulating the thickness of a travelling sheet of material, comprising, in combination, a generator and motor having armatures connected in loop circuit, and having separated field windings, said motor being effective to drive and tension said sheet, variable resistance means for controlling the field strength of said motor field winding, means responsive to the thickness of the sheet for varying said variable resistance means within a predetermined range so as to control, in small increments, the torque of said motor, hence the tension and thickness of said sheet, means including a relay for shunting said variable resistance means in response to an abnormally high current in said armature loop circuit, thereby effecting an increase in energization and a decrease in speed of said motor, and means including a resistor in series with said variable resistance means and a relay normally shunting said relay, which relay is responsive to abnormally low currents in said armature loop circuit for inserting said resistor in series with said variable resistance means, thereby effecting a decrease in energization of said motor, hence an increase in speed thereof so as to keep the tension of the sheet at an optimum range at all times.

6. A variable voltage control system for regulating the thickness of a travelling sheet of material, comprising, in combination, a generator and motor having armatures connected in loop circuit, and having separated field windings, said motor being effective to drive and tension said sheet, variable resistance means for controlling the field strength of said motor field winding, pressure responsive means including a source of air supply and a nozzle supplied thereby and located closely adjacent the surface of the sheet which is responsive to the thickness of the sheet for varying said variable resistance means within a predetermined range so as to control, in small increments, the torque of said motor, hence the tension and thickness of said sheet, means including a relay for shunting said variable resistance means in response to an abnormally high current in said armature loop circuit, thereby effecting an increase in energization and a decrease in speed of said motor, and means including a resistor in series with said variable resistance means and a relay normally shunting said relay, which relay is responsive to abnormally low currents in said armature loop circuit for inserting said resistor in series with said variable resistance means, thereby effecting a decrease in energization of said motor, hence an increase in speed thereof so as to keep the tension of the sheet at an optimum range at all times.

7. A variable voltage control system for regulating the thickness of a travelling sheet of material, comprising, in combination, a generator and motor having armatures connected in loop circuit, and having separated field windings, said motor being effective to drive and tension said sheet, variable resistance means for controlling the field strength of said motor field winding, means responsive to the thickness of the sheet for varying said variable resistance means within a predetermined range so as to control, in small increments, the torque of said motor, hence the tension and thickness of said sheet, means including a relay for shunting said variable resistance means in response to an abnormally high current in said armature loop circuit, thereby effecting an increase in energization and a decrease in speed of said motor, and means including a resistor in series with said variable resistance means and a relay normally shunting said relay, which relay is responsive to abnormally low currents in said armature loop circuit for inserting said resistor in series with said variable resistance means, thereby effecting a decrease in energization of said motor, hence an increase in speed thereof so as to keep the tension of the sheet at an optimum range at all times, an exciter having a field winding in circuit relationship to said variable resistance means and resistor and having an armature which is connected across said motor field winding, anti-hunting means comprising two transformers and an electromagnet, the primaries of the transformers being connected in series and parallel respectively with said exciter armature and the secondaries being connected in series with a winding of said electromagnet, said electromagnet operating on said variable resistance means in a direction opposite to that of its thickness responsive means.

8. A variable voltage control system for regulating the thickness of a travelling sheet of material, comprising, in combination, a generator and motor having armatures connected in loop circuit, and having separated field windings, said motor being effective to drive and tension said sheet, variable resistance means for controlling the field strength of said motor field winding, pressure responsive means including a source of air supply and a nozzle supplied thereby and located closely adjacent the surface of the sheet which is responsive to the thickness of the sheet for varying said variable resistance means within a predetermined range so as to control, in small increments, the torque of said motor, hence the tension and thickness of said sheet, means including a relay for shunting said variable resistance means in response to an abnormally high current in said armature loop circuit, thereby effecting an increase in energization and a decrease in speed of said motor, and means including a resistor in series with said variable resistance means and a relay normally shunting said relay, which relay is responsive to abnormally low currents in said armature loop circuit for inserting said resistor in series with said variable resistance means, thereby effecting a decrease in energization of said motor, hence an increase in speed thereof so as to keep the tension of the sheet at an optimum range at all times, an exciter having a field winding in circuit relationship to said variable resistance means having a plurality of shunting contact members supported by a plurality of leaves tapped off, a resistor having an armature which is connected across said motor field winding, anti-hunting means comprising two transformers and an electromagnet, the primaries of the transformers being connected in series and parallel respectively with said exciter armature and the secondaries being connected in series with a winding of said electromagnet, said electromagnet operating on said variable resistance means in a direction opposite to that of the thickness responsive means, said electromagnet including a pivoted armature having a force applied thereto in accordance with the thickness of said sheet as detected by said pressure responsive means and having a spring for applying a force thereto for normally biasing the multi-leaved contacts of said variable resistance means in an open position.

9. A variable voltage control system for regulating the thickness of a travelling sheet of material, comprising, in combination, a generator and motor having armatures connected in loop circuit, and having separated field windings, said motor being effective to drive and tension said sheet, variable resistance means for controlling the field strength of said motor field winding, means responsive to the thickness of the sheet for varying said variable resistance means within a predetermined range so as to control, in small increments, the torque of said motor, hence the tension and thickness of said sheet, means including a relay for shunting said variable resistance means in response to an abnormally high current in said armature loop circuit, thereby effecting an increase in energization and a decrease in speed of said motor, and means including a resistor in series with said variable resistance means and a relay normally shunting said relay, which relay is responsive to abnormally low currents in said armature loop circuit for inserting said resistor in series with said variable resistance means, thereby effecting a decrease in energization of said motor, hence an increase in speed thereof so as to keep the tension of the sheet at an optimum range at all times, an exciter having a field winding in circuit relationship to said variable resistance means and resistor and having an armature which is connected across said motor field winding, anti-hunting means comprising two transformers, the primaries of the transformers being connected in series and parallel respectively with said exciter armature and the secondaries being connected in series with said respective relays.

10. A variable voltage control system for regulating the thickness of a travelling sheet of material, comprising, in combination, a generator and motor having armatures connected in loop circuit, and having separated field windings, said motor being effective to drive and tension said sheet, variable resistance means for controlling the field strength of said motor field winding, means responsive to the thickness of the sheet for varying said variable resistance means within a predetermined range so as to control, in small increments, the torque of said motor, hence the tension and thickness of said sheet, means including a relay for shunting said variable resistance means in response to an abnormally high current in said armature loop circuit, thereby effecting an increase in energization and a decrease in speed of said motor, and means including a resistor in series with said variable resistance means and a relay normally shunting said relay, which relay is responsive to abnormally low currents in said armature loop circuit for inserting said resistor in series with said variable resistance means, thereby effecting a decrease in energization of said motor, hence an increase in speed thereof so as to keep the tension of the sheet at an optimum range at all times, an exciter having a field winding in circuit relationship to said variable resistance means and resistor and having an armature which is connected across said motor field winding, anti-hunting means comprising two transformers and an electromagnet, the primaries of the transformers being connected in series and parallel respectively with said exciter armature and the secondaries being connected in series with a winding of said electromagnet, said electromagnet operating on said variable resistance means in a direction opposite to that of its thickness responsive means, a second anti-hunting means comprising two additional transformers, the primaries of the transformers being connected in series and parallel respectively with said exciter armature and the secondaries being connected in series with said respective relays.

11. A variable voltage control system for regulating the thickness of a travelling sheet of material, comprising, in combination, a generator and motor having armatures connected in loop circuit, and having separated field windings, said motor being effective to drive and tension said sheet, variable resistance means for controlling the field strength of said motor field winding, pressure responsive means including a source of air supply and a nozzle supplied thereby and located closely adjacent the surface of the sheet which is responsive to the thickness of the sheet for varying said variable resistance means within a predetermined range so as to control, in small increments, the torque of said motor, hence the tension and thickness of said sheet, means including a relay for shunting said variable resistance means in response to an abnormally high current in said armature loop circuit, thereby effecting an increase in energization and a decrease in speed of said motor, and means including a resistor in series with said variable resistance means and a relay normally shunting said relay, which relay is responsive to abnormally low currents in said armature loop circuit for inserting said resistor in series with said variable resistance means, thereby effecting a decrease in energization of said motor, hence an increase in speed thereof so as to keep the tension of the sheet at an optimum range at all times, an exciter having a field winding in circuit relationship to said variable resistance means and resistor and having an armature which is connected across said motor field winding, anti-hunting means in circuit relationship with said exciter armature for operating on said variable resistance means in a direction opposite to that of the pressure responsive means.

CLINTON R. HANNA.